(12) United States Patent
Carlisle

(10) Patent No.: US 11,767,943 B2
(45) Date of Patent: Sep. 26, 2023

(54) VENT BOX METHOD AND APPARTUS

(71) Applicant: Xcel Energy, Inc., Minneapolis, MN (US)

(72) Inventor: David Carlisle, Minneapolis, MN (US)

(73) Assignee: Xcel Energy, Minneapolis, MN (US)

(*) Notice: Subject to any disclaimer, the term of this patent is extended or adjusted under 35 U.S.C. 154(b) by 5 days.

(21) Appl. No.: 17/499,302

(22) Filed: Oct. 12, 2021

(65) Prior Publication Data

US 2022/0186872 A1 Jun. 16, 2022

Related U.S. Application Data

(60) Provisional application No. 63/123,738, filed on Dec. 10, 2020.

(51) Int. Cl.
| | | |
|---|---|---|
| *F16L 55/18* | (2006.01) | |
| *F16L 55/175* | (2006.01) | |
| *F16L 55/179* | (2006.01) | |

(52) U.S. Cl.
CPC ............ *F16L 55/18* (2013.01); *F16L 55/175* (2013.01); *F16L 55/179* (2013.01)

(58) Field of Classification Search
CPC ........ F16L 55/18; F16L 55/175; F16L 55/179
USPC .......................................................... 138/97
See application file for complete search history.

(56) References Cited

U.S. PATENT DOCUMENTS

| | | | |
|---|---|---|---|
| 3,238,973 A | 3/1966 | Roach | |
| 3,550,638 A | 12/1970 | Smith | |
| 3,603,616 A | 9/1971 | Smith | |
| 3,927,158 A | 12/1975 | Croft et al. | |
| 3,938,774 A | 2/1976 | Smith | |
| 4,073,836 A | 2/1978 | Harrison et al. | |
| 4,323,526 A | 4/1982 | Hilbush, III | |
| 5,118,139 A | 6/1992 | Lott | |
| 5,345,972 A * | 9/1994 | Goglio | F16L 55/175 138/167 |
| 5,577,535 A | 11/1996 | Motta et al. | |
| 6,167,912 B1 | 1/2001 | Stephens | |
| 6,220,302 B1 * | 4/2001 | Nolley | F16L 55/103 139/97 |
| 6,755,216 B1 * | 6/2004 | Mostala | F16L 55/18 138/92 |
| 7,472,722 B2 | 1/2009 | Nadarajah et al. | |
| 8,158,001 B2 * | 4/2012 | Taylor | B01D 63/022 285/368 |
| 8,628,275 B1 * | 1/2014 | Trader | E02D 5/64 405/211 |
| 9,027,605 B2 | 5/2015 | Williams | |
| 9,599,260 B1 * | 3/2017 | Howell | F16L 17/10 |

(Continued)

FOREIGN PATENT DOCUMENTS

| | | |
|---|---|---|
| CN | 106958743 A | 7/2017 |
| GB | 2210134 A | 6/1989 |
| WO | WO1983002490 | 7/1983 |

*Primary Examiner* — Craig M Schneider
*Assistant Examiner* — David R Deal
(74) *Attorney, Agent, or Firm* — Daniel A. Rosenberg; Taft Stettinius & Hollister LLP

(57) ABSTRACT

The present invention relates to a method and apparatus for repairing a leak in a pressurized pipe, and more particularly to a vent box for use in repairing a leak in a pipe carrying pressurized steam. The sealant is applied to the leak, the vent box is in place over the leak, and the vent is opened during the curing process.

14 Claims, 8 Drawing Sheets

(56) References Cited

U.S. PATENT DOCUMENTS

| | | | |
|---|---|---|---|
| 2006/0065320 A1* | 3/2006 | Borland | F16L 55/175 |
| | | | 285/15 |
| 2012/0279601 A1* | 11/2012 | Kerr | F16L 55/172 |
| | | | 138/97 |
| 2017/0113426 A1* | 4/2017 | Mainzer | F16L 55/175 |
| 2018/0187818 A1* | 7/2018 | Mitchell | F16L 55/1683 |

* cited by examiner

US 11,767,943 B2

VENT BOX METHOD AND APPARTUS

RELATED APPLICATIONS

The present application incorporates by reference, and claims priority to U.S. Provisional Patent Application No. 63/123,738, filed on Dec. 10, 2020.

BACKGROUND OF THE INVENTION

Field of the Invention

The present invention relates to a method and apparatus for repairing a leak in a pressurized pipe, and more particularly to a vent box or pressure retaining enclosure for use in repairing a leak in a pipe carrying pressurized steam.

Background

Pressurized pipes that carry fluids or gases have been known to develop leaks over time as a result of normal wear and tear, or from damage from various sources. This is particularly a problem for steam pipes, as the relatively high pressure and temperature of the steam can contribute to deterioration of the carrier medium.

If left unattended, over a period of time the leak will worsen and eventually threaten the integrity of the pipe, as well as the greater assembly to which the pipe often forms a critical component. These assemblies can include electrical generating plants that use coal, gas, or nuclear fuels to power steam turbines to generate electricity, as well as any other facility that uses pipes to carry fluids or gases. The leaks never fix themselves, or go away on their own, and so corrective measures are necessary to repair the leaks.

Many techniques have been used in the prior art to repair such leaks, often including the use of sealants. This typically will not work by itself since the pressure coming out of the leak will work its way through the sealant at the site of the leak before the sealant can cure.

For this reason, many prior art solutions use some form of a box, jig, or enclosure to surround the outside the pipe and the leak, applying pressure in excess of the leak pressure for enough time to allow the sealant to cure. This method suffers from many drawbacks. It is more likely to cause additional stress on the piping. When sealant is injected into the enclosure cavity, the pressure can harm the pipe, which is already damaged as result of the leak. The enclosure creates a sealed cavity, and the pressure in the cavity increases. This pressure works to prevent sealing. The sealant can be pushed out of the gaps between the piping and enclosure. The steam or leaking fluid can create channels (unsealed pathways) through the sealant. The steam or process fluid can contact the piping exterior wall preventing adhesion of the sealant to the piping surface. Ultimately maintaining pressure within the cavity during sealant curing reduces the likelihood of a successful seal.

Some prior art enclosures include cavity vents, however, they are used solely before the cure steps, and the vents are closed once the sealant is applied, or in some cases the vent is used as an opening to introduce sealant into the enclosure.

The following is a list of references in the field of the present invention, which may or may not include subject matter relevant to the problems in the art or the present invention: U.S. Pat. Nos. 3,550,638, 3,603,616, 4,073,836, GB2210134B, U.S. Pat. No. 4,323,526, CN106958743A, U.S. Pat. Nos. 5,118,139, 3,938,774, 3,238,973, WO1983002490, U.S. Pat. Nos. 3,927,158, 7,472,722, 5,577,535, 9,027,605, and 6,167,912.

The long term solution for fixing the leak is to shut down the pipe, vent it completely, and remove the damaged section and replace it with a new section. This typically requires shutting down the facility entirely, and cannot be done as a practical matter except during a total plant shutdown, which occur infrequently.

Thus a need exists for a temporary or semi-permanent method and apparatus to stop leaks in pressurized pipes that avoids the problems of the prior art.

DETAILED DESCRIPTION OF THE INVENTION

Figure 1:
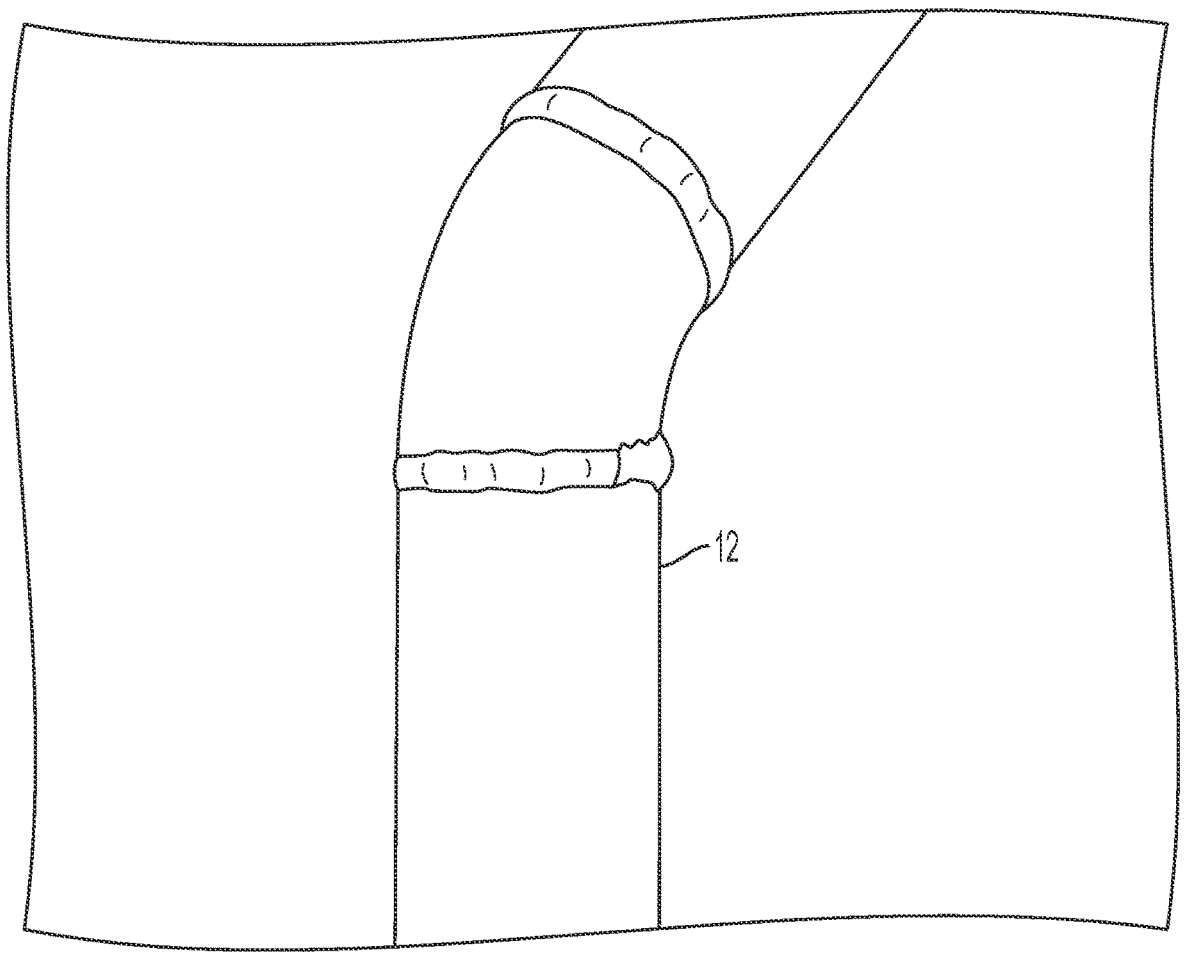
FIG. 1 shows a perspective view of a section of pipe.

The present invention relates to a method and apparatus for repairing leaks in a pressurized pipe, such as a steam pipe. In the Figures, a vent box 10 for securing to a section of pipe 12 is shown. In particular, FIG. 1 shows a pipe 12 suitable for repair in accord with the present invention. Here, the pipe 12 is a steam pipe and the leak is located at a 45° elbow of the pipe 12. The invention, however, is not limited to use with steam pipes, and can be used to repair a leak in any section of pipe.

Figure 2:
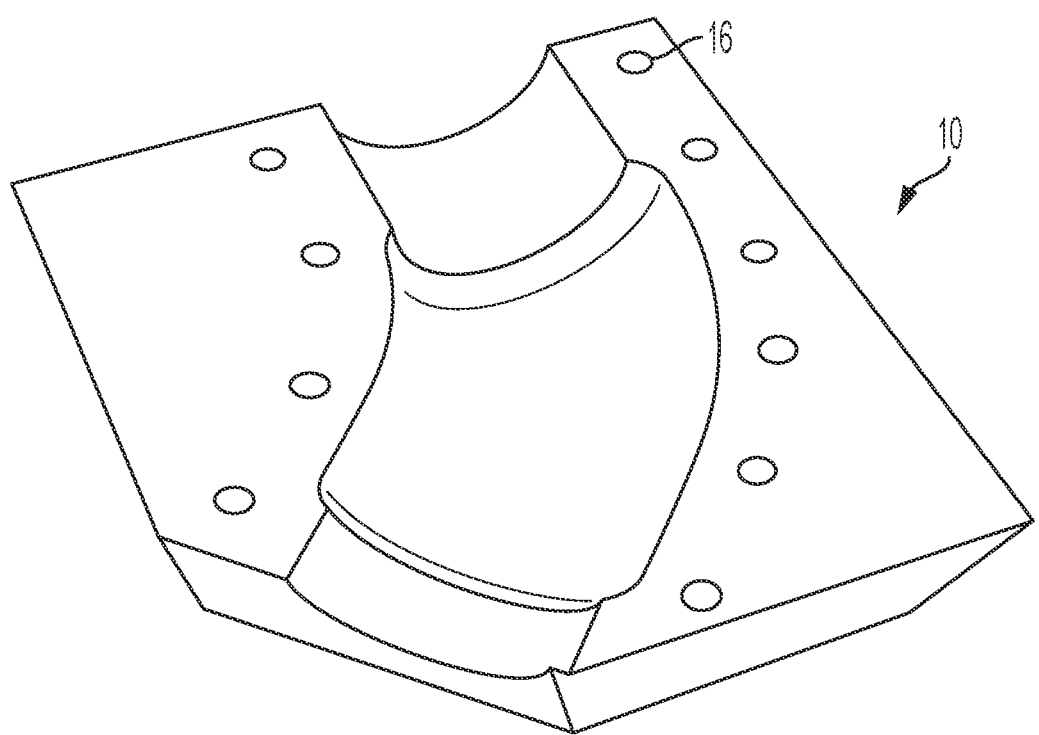
FIG. 2 shows a perspective view of the inside of a first piece of a two piece vent box.

FIG. 2 shows the inside of one half of the vent box 10. The vent box 10 is comprised of two halves (as described below), which fit around the portion of the pipe 12 with the leak. As shown in FIG. 2, the vent box 10 contains an internal cavity shaped to narrowly match the outside contour of the pipe 12 to which it will be affixed. The contour of the pipe 12 can be of any diameter or shape. Thus, the vent box 10 can fit on a straight section of pipe 12, a curved section, or can fit to any intersection of pipes 12 like a T-junction and the like.

Figure 3:
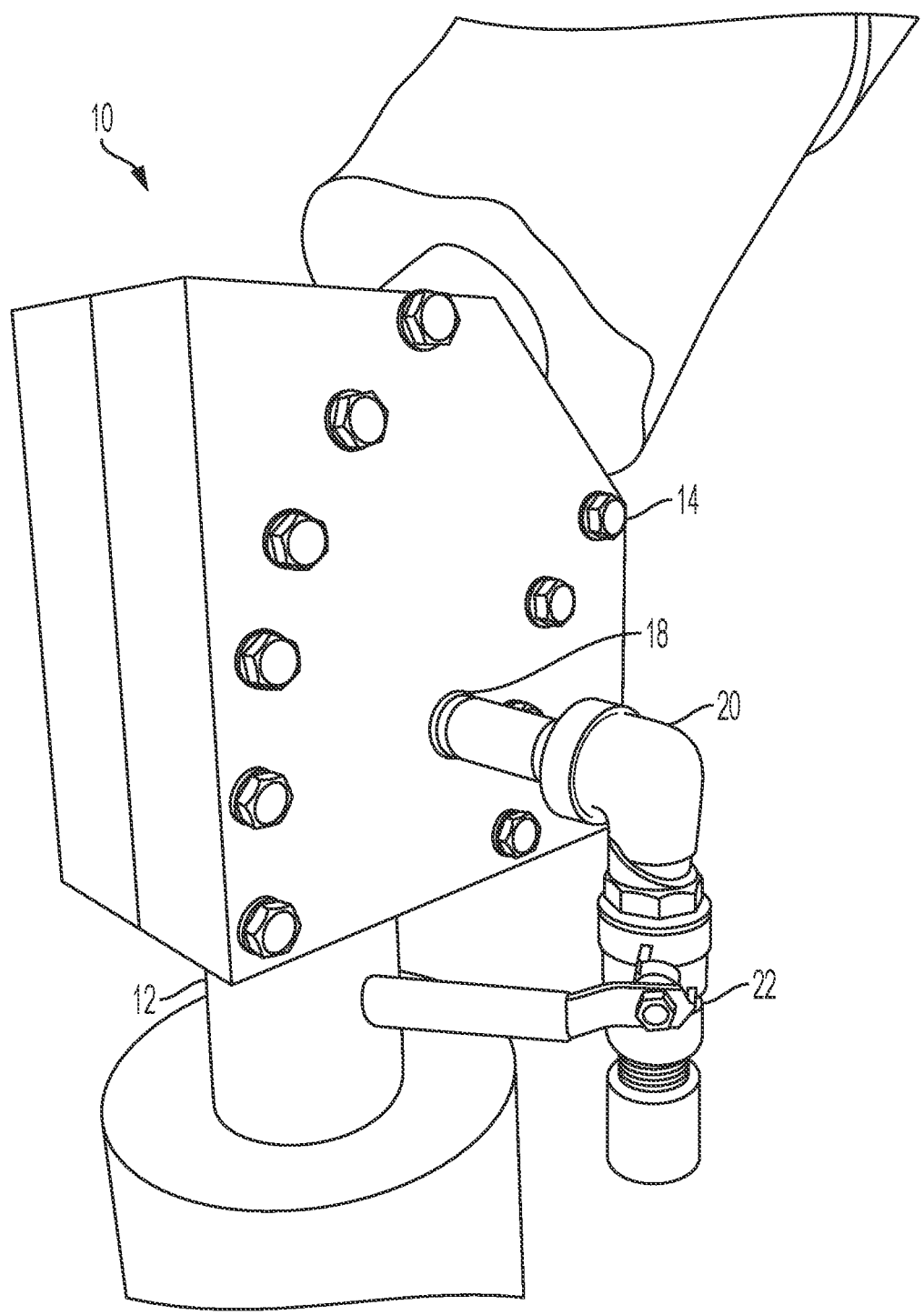
FIG. 3 shows a perspective view of the vent box installed on the pipe.

FIG. 3 shows the vent box 10 in place around the pipe 12. The vent box 12 is secured with a plurality of threaded bolts/nuts 14 inserted through mating holes 16 in each of the halves of the vent box 10. One half of the vent box 10 includes a large centrally located opening 18 through which a vent 20 is secured.

Figure 4:
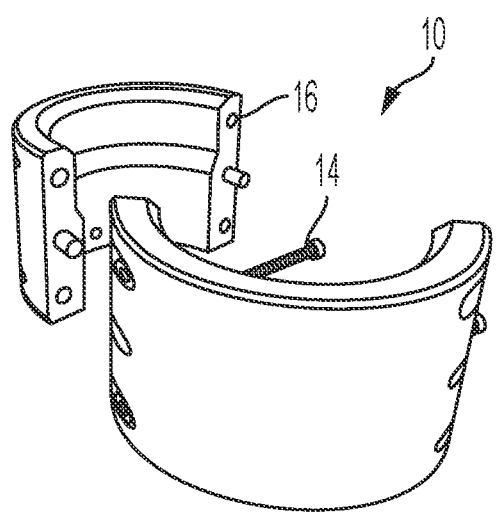
FIG. 4 shows a perspective view of the two pieces of the vent box.

FIG. 4 shows another embodiment of the vent box 10 for a straight section of pipe 12. The vent box 10 includes two halves that are connected by threaded bolts/nuts 14 that insert through mating holes 16 in the vent box halves.

Figure 5:
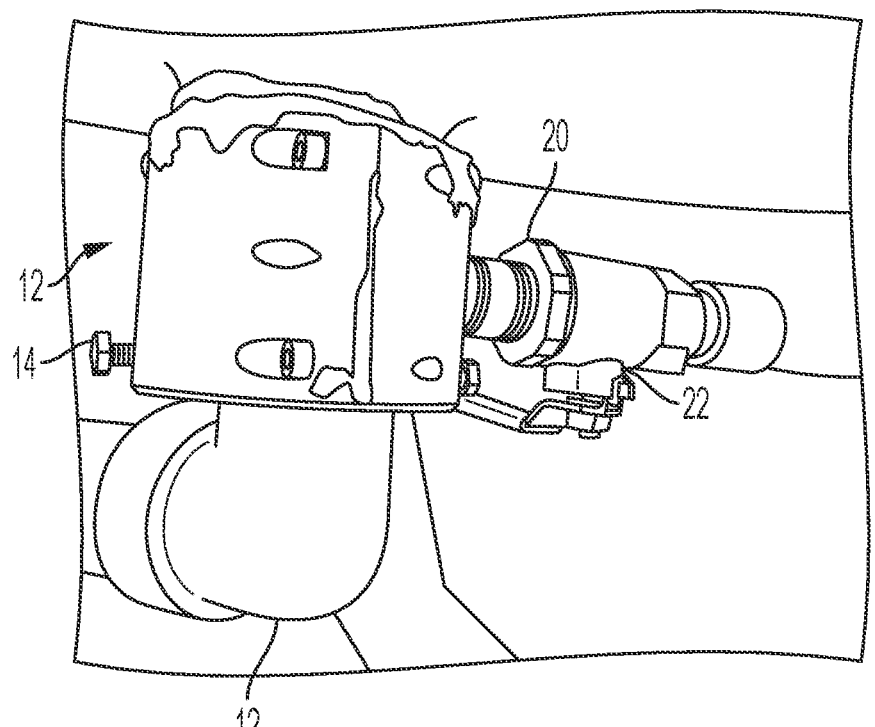
FIG. 5 shows a perspective view of the vent box of FIG. 4 installed on a section of pipe.

FIG. 5 shows the vent box 10 of FIG. 4 installed on a section of pipe 12, where the vent 20 is visible. The 20 vent secures to a hole/opening 18 in one of the halves of the vent box 10.

Figure 6:
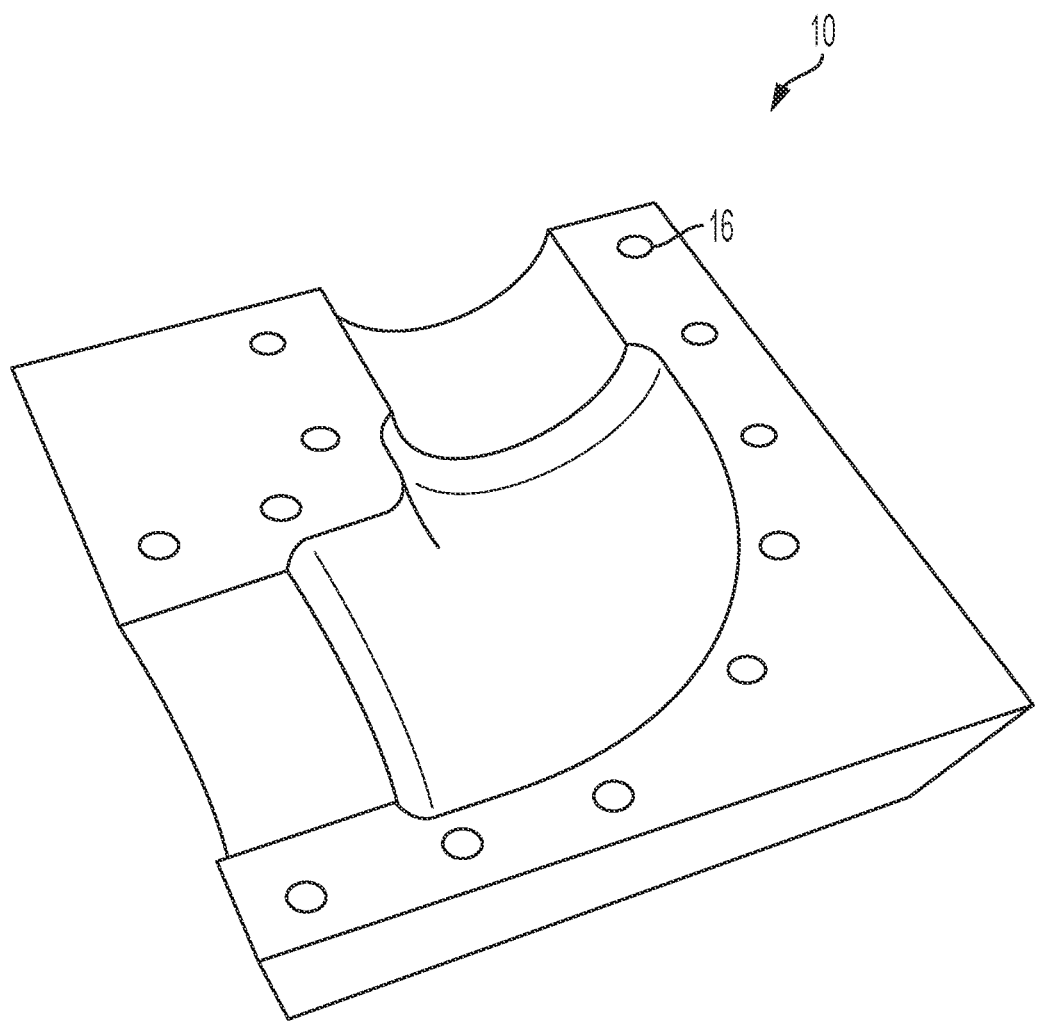
FIG. 6 shows a perspective view of the inside of a second piece of the two piece vent box (the first piece shown in FIG. 2).
Figure 7:
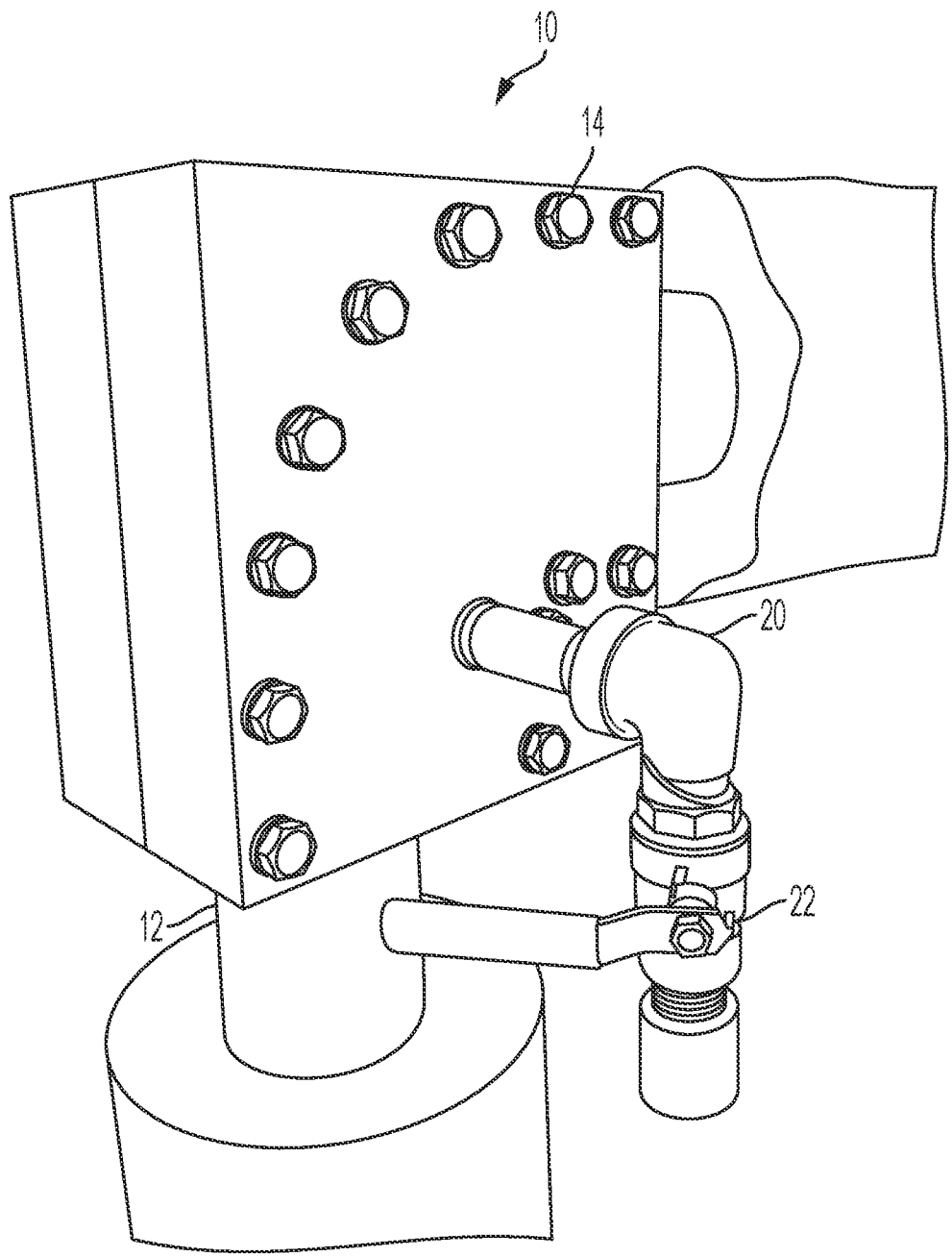
FIG. 7 shows a perspective view of the vent box installed on the pipe.

FIG. 6 shows the inside of one half of vent box 10 shown in FIG. 7, which secures to a 90 degree bend.

FIG. 7 shows the vent box 10 secured to a section of pipe with a 90 degree bend.

Figure 8:
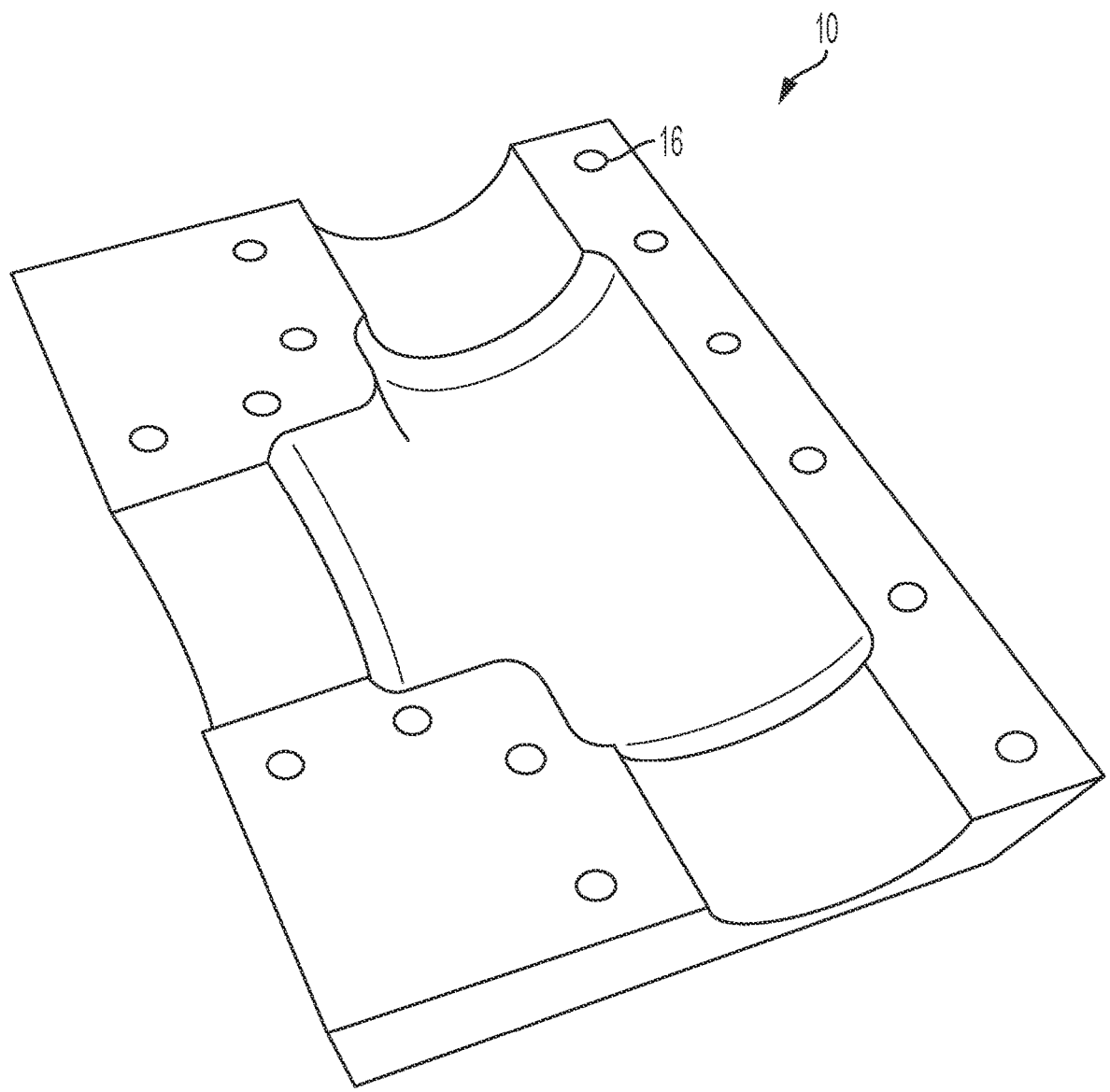
FIG. 8 shows a perspective view of the inside of one section of the vent box shown in FIG. 9.
Figure 9:
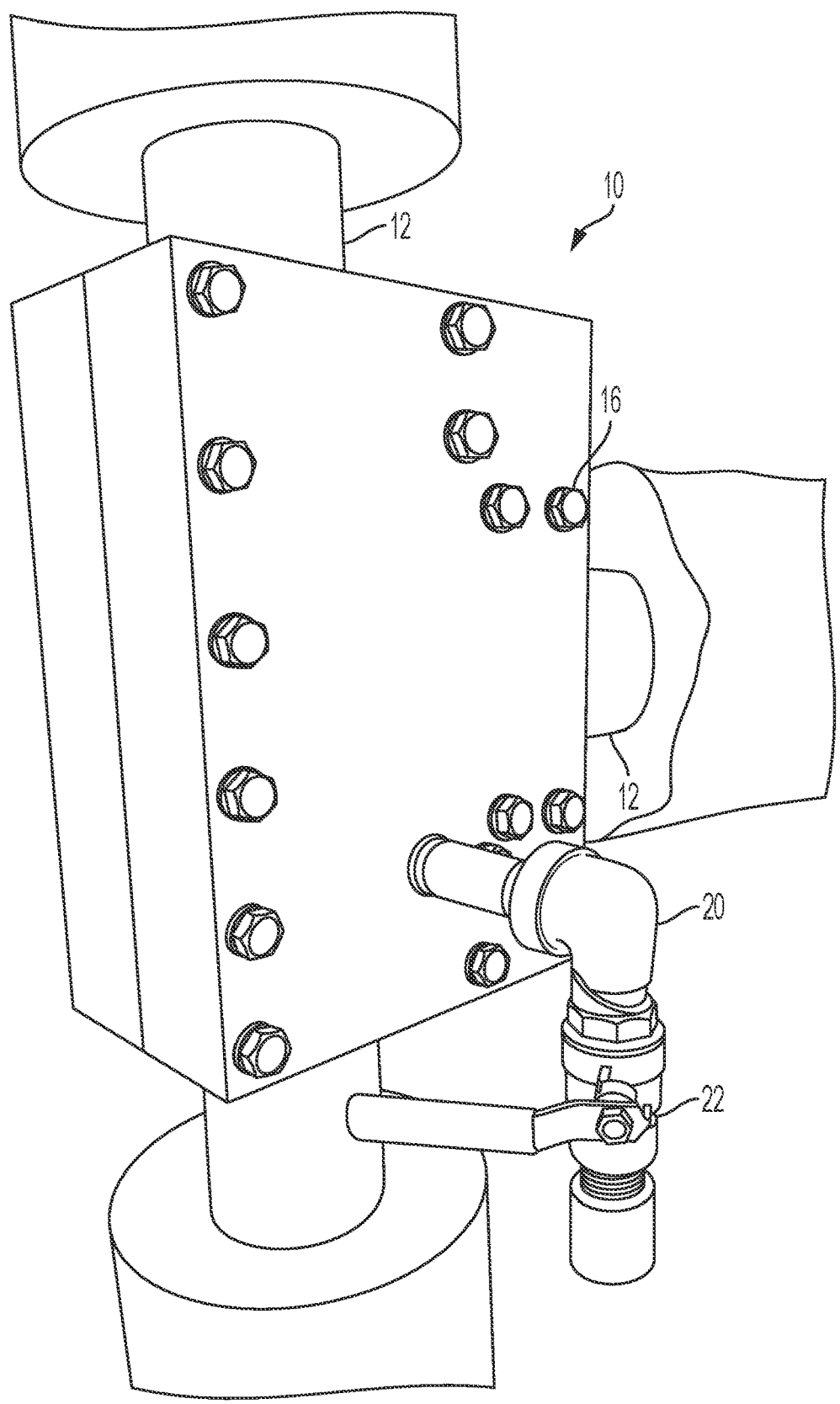
FIG. 9 shows a perspective view of a vent box connected to a T-junction of pipe.

FIG. 8 shows the inside of one half of the vent box 10 shown in FIG. 9, which secures to a T-junction where two pipes 12 meet.

The vent box 10 is constructed from a suitably hard material such as stainless steel. Other similar materials can be used such as low carbon steel (mild steel), or any other material that can stand up to the pressure and temperature involved. The present invention is not believed to be meaningfully limited in terms of pressure and temperature of the fluid/gas in the pipe. The available sealants are the limiting factor in terms of pressure and temperatures, and the invention has proven effective for use on pipes with a pressure up to about 175 lbs/square inch, and temperatures of up to about 350° F.

The method of the present involves constructing a vent box 10 of the proper dimensions. The vent box 10 typically would be close in size to the outer diameter of the leaking pipe 12. Preferably, the inner diameter of the vent box 10 would provide a clearance fit to provide some room for the sealant. Sealant is then applied. Sealant is applied to the inside surfaces of each half of the vent box 10, and to the adjoining surfaces of the vent box 10. In this manner, the leak in the pipe is sealed as well as the vent box 10 itself. The vent box 10 is then placed around the leak in the pipe 12, and secured with the threaded nuts and bolts 14. Alternatively, the vent box 10 can be put in place first, and then sealant can be injected through the vent hole 18, or another injection port. Care should be used to ensure that the injection pressure is not excessive.

The vent 20 can be attached to the vent hole 18 either before or after the vent box 10 is put in place. The vent 20 comprises a section of pipe attached to the vent hole 18 in the vent box 10, and a valve 22 is attached to the other end of the pipe section. The length of pipe can vary depending on the application, but preferably, it will be long enough to allow for attaching the valve 22 so that is can be easily accessed and operated.

Once the vent box 10 is in place, the vent 20 remains open for enough time to allow the sealant to cure. The vent 20 can be closed (for example during sealant injection or installation of the vent box 10), and then opened during curing. The vent 20 can be fully opened or partially opened during curing depending on circumstances. The vent 20 remains open during the curing process, which varies in duration depending on the sealant used. The sealant is typically a commercially available product such as a heat activated epoxy provided by Master Bond, or a similar product.

The present invention is useful in sealing leaks, at least temporarily until the section of pipe 12 can be replaced, in all kinds of pressurized pipes 12, but preferably in pressurized steam pipes 12 with small leaks suitable for temporary repair by this method. The vent box 10 can be left in place until permanent repairs can be made to the pipe. The vent 20 can remain open or be closed after the sealant has cured. Further, the vent box 10 can be removed after the sealant has cured. The invention is not necessarily limited thereto.

The present invention substantially overcomes the limitations of the prior art, which teaches away from the present invention. The prior art methods use a block or clamp around the leak in the pipe, and then sealant is injected under pressure. The pressure used must exceed that of the leak and can put enough stress on the damaged pipe that it can break given that the pipe is already compromised by the leak. Steam leaks in a pipe can act as an abrasive that pits and erodes the pipe, particularly at the point of the leak, which weakens the pipe making it susceptible to breaking under the pressure of prior art clamping and injection.

The present invention does not put the pipe under damaging pressure, but instead allows some or all of the excess pressure to vent away during curing. The vent is relatively large compared to the leak, and therefore reduces the pressure from the leak but allows the clamping pressure applied to the sealant to remain in place. This allows the sealant to cure, without subjecting the pipe to excessive pressure.

The above specification and accompanying Figure are for illustrative use only. The scope of the present invention is defined by the claims. The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. Those of ordinary skill in the art that have the disclosure before them will be able to make modifications and variations therein without departing from the scope of the invention.

The invention claimed is:

1. A method of curing a leak in a steam pipe, comprising:
providing a vent box having a vent for opening and closing;
applying sealant to the interior surfaces of the vent box;
securing the vent box to a portion of the pipe such that a cavity is formed between the vent box and the pipe such cavity directly containing the leak;
opening the vent of the vent box while the sealant is curing; and
waiting for the sealant to cure.

2. The method of claim 1 further providing that the vent box has a first half and a second half, wherein the securing step involves securing the first and second halves of the vent box to the pipe.

3. The method of claim 2 where the halves of the vent boxes are secured to each other with bolts and nuts.

4. The method of claim 1 where the vent has a valve that can be selectively moved between an open and a closed position.

5. The method of claim 1 where the applying step comprises injecting the sealant into the vent box through an injection port in the vent box after the securing step has been completed.

6. The method of claim 5 where the valve is closed during injecting step and is opened during the opening step.

7. The method of claim 1 where the apply step comprises injecting the sealant into the vent box through the vent.

8. The method of claim 1 further comprising the step of removing the vent box after the sealant has cured.

9. The method of claim 1 where the valve is completely open to atmosphere during the waiting step.

10. The method of claim 1 where the valve is partially open to atmosphere during the waiting step.

11. A method of curing a leak in a steam pipe, comprising:
providing a vent box comprising a first half and a second half, a vent in one of the halves, and a valve connected to the vent;
releasably securing the vent box to the pipe by connecting the first half and second half to each other with bolts and nuts so the vent box surrounds the leak;

injecting sealant into the interior surfaces of the vent box, directly into the area of the pipe containing the leak, through an injection port in one of the two halves of the vent box;

opening the valve of the vent of the vent box; and waiting for the sealant to cure.

12. The method of claim 11 further comprising the step of removing the vent box after the sealant has cured.

13. The method of claim 11 further comprising the step of closing the valve of the vent box after the sealant has cured.

14. A method of curing a leak in a steam pipe, comprising:

providing a vent box having a vent for opening and closing;

securing the vent box to the pipe;

applying sealant directly to the leak in the pipe through an injection port in the vent box;

opening the vent of the vent box while the sealant is curing; and waiting for the sealant to cure.

* * * * *